United States Patent [19]

Bialy

[11] Patent Number: 5,351,516
[45] Date of Patent: Oct. 4, 1994

[54] RAIL REPAIR DEVICE

[75] Inventor: Louis Bialy, Simsbury, Conn.

[73] Assignee: Otis Elevator Company, Farmington, Conn.

[21] Appl. No.: 744,758

[22] Filed: Aug. 14, 1991

[51] Int. Cl.⁵ .................. B21B 1/14; B21B 31/30
[52] U.S. Cl. .............................. 72/199; 72/210; 72/237; 72/244
[58] Field of Search ............... 72/7, 34, 36, 199, 210, 72/211, 237, 241.2, 244, 248, 252.5; 29/33 A, 402.19; 51/178, 3, 40, 165.79, 241 LG, 324, 330, 338, 339, 355; 104/127, 129, 229, 233; 291/2, 15; 409/289, 297, 298

[56] References Cited

U.S. PATENT DOCUMENTS

| | | | |
|---|---|---|---|
| 1,046,020 | 12/1912 | Rhodes | 72/210 |
| 2,450,211 | 9/1948 | Stone et al. | 72/210 |
| 2,722,867 | 11/1955 | Dackor et al. | 409/289 |
| 3,077,131 | 2/1963 | McShane | 72/246 |
| 3,197,986 | 8/1965 | Freedman et al. | 72/244 |
| 3,256,726 | 6/1966 | Kanookov et al. | 72/199 |
| 3,974,594 | 8/1976 | Urbank | 51/178 |
| 4,218,907 | 8/1980 | Ruhl | 72/241.2 |
| 4,538,706 | 9/1985 | Koppensteiner | 187/90 |

FOREIGN PATENT DOCUMENTS 9008012  7/1990  PCT Int'l Appl. ............ 51/241 LG Primary Examiner—Lowell A. Larson
Assistant Examiner—Thomas C. Schoeffler

[57] ABSTRACT

An adjustable elevator rail repair device (14) is provided with a means for forcing raised damaged areas (18) of an elevator rail (10) back into the corresponding depressions (20) of the rail surface (9). The forcing means comprises a roller (24) rotatably mounted within a wedge (22), adjustably positioned in a housing (16). A method is disclosed for repairing the damaged rail (10) comprising a calculating step to determine the amount of adjustment necessary for the rail repair device (14).

19 Claims, 2 Drawing Sheets

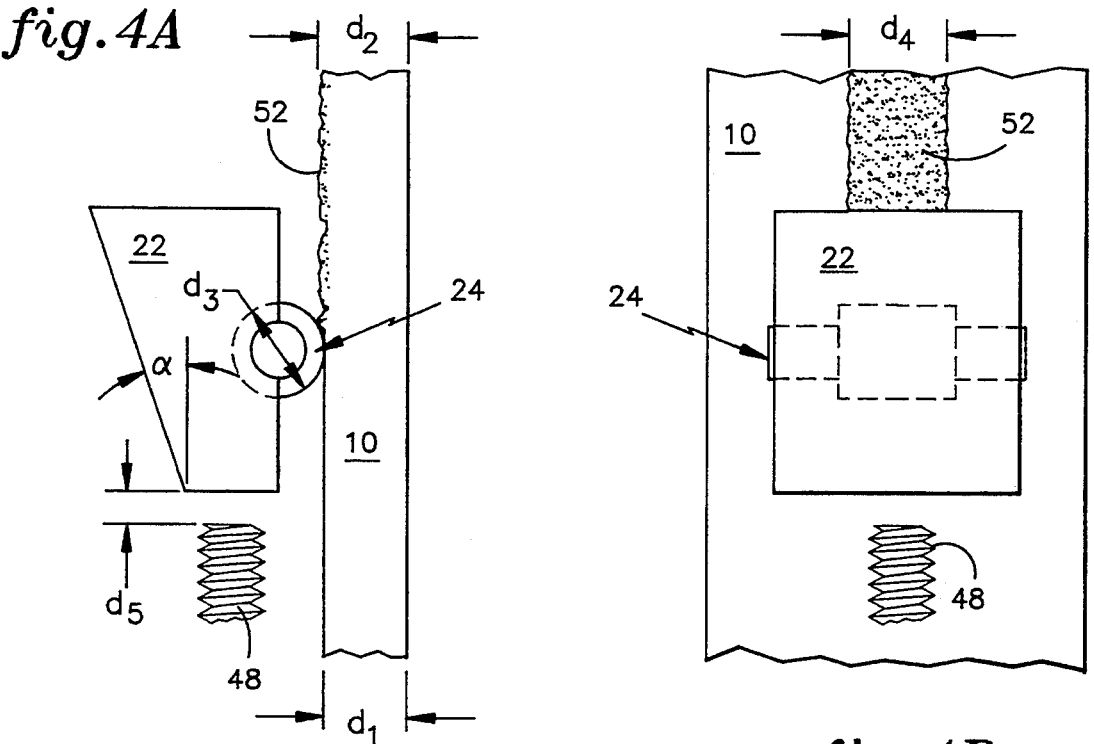
fig.4A
fig.4B
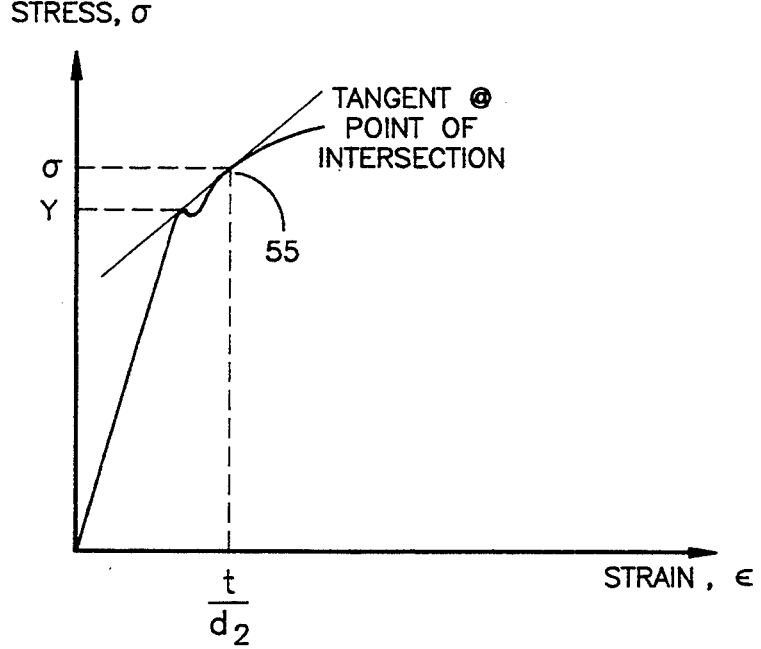
fig.5

RAIL REPAIR DEVICE

TECHNICAL FIELD

This invention relates to elevators and more particularly to elevator safety and maintenance devices.

BACKGROUND ART

Safety regulations concerning the operation of elevators require a progressive safety on an elevator car or on its counterweight. A progressive safety decelerates an elevator when the elevator's speed exceeds a predetermined value. The deceleration increases with distance traveled by the elevator, thereby comfortably slowing the elevator.

One of the more popular progressive safeties is that disclosed by Koppensteiner in U.S. Pat. No. 4,538,706. Koppensteiner discloses a safety device which straddles an elevator rail. The device employs a brake surface on one side of the rail and a leaf spring and roller assembly on the opposite side. When the elevator governor activates the safety, the roller wedges in between the leaf-spring assembly and a rail face. As a result, the brake lining located on the opposite side of the rail contacts the opposite rail face, producing a braking force on the elevator car. To ensure that the roller properly wedges between the leaf-spring assembly and the rail face, Koppensteiner teaches that a section of the roller face should be knurled. The knurling increases the coefficient of friction between the roller face and the elevator rail. The direct contact of the knurled roller and the brake surface with the rail faces, however, may result in a scored and damaged rail.

A scored rail face causes several problems. In an elevator with sliding guides, scored rails will damage the guides resulting in a decrease in guide life. Similarly, scored rails may also affect the smoothness of the elevator ride as well as create undesirable running noise. Elevators with roller-type guides are also susceptible to these problems when the rails become scored.

Prior art methods of rehabilitating a scored rail include hand filing the scored section and subsequently filling the indentation or pits with a filler material such as lead. One disadvantage of this method of repair is that the rail is compromised by using a softer filler material which is more susceptible to later scoring. Another disadvantage lies in the build-up of debris that occurs as the softer material wears due to the movement of the guides.

DISCLOSURE OF THE INVENTION

It is an object of the present invention to provide an elevator rail repair device which is capable of rehabilitating a scored elevator rail.

According to the present invention a rail repair device comprises means to force raised damage areas of an elevator rail surface into corresponding depressions of the rail surface.

According to one aspect of the present invention, a housing is used to support the means to force raised damage areas of an elevator rail surface into corresponding depressions of the rail surface.

According to another aspect of the present invention, the means to force the raised damage areas of an elevator rail surface into corresponding depressions of the rail surface comprises a roller.

According to another aspect of the present invention, the means to force the raised damage areas of an elevator rail surface into corresponding depressions of the rail surface further comprises a wedge, which communicates with the roller, as a means of adjusting the position of the roller within the housing relative to the rail.

According to another aspect of the present invention, the means to force the raised damage areas of an elevator rail surface into corresponding depressions of the rail surface further comprises an adjustable stop attached to the housing which may be used to adjust the position of the wedge relative to the rail.

An advantage of the present invention is that the depressions in the elevator rail surface caused by the scoring are either minimized or eliminated. A further advantage of the present invention is the elimination of having to use a softer filler material to fill the depressions in the elevator rail surface, as taught in the prior art. An even further advantage of the present invention lies in the cam surface design of the wedge. The cam surface of the wedge not only provides a simple, effective means of adjustment, but also enables a percentage of the load experienced by the roller to be transferred directly to the housing.

These and other objects, features, and advantages of the present invention will become more apparent in light of the detailed description of the best mode embodiment thereof, as illustrated in the accompanying drawings.

BRIEF DESCRIPTION OF THE DRAWINGS

FIG. 4A is a side view of a roller and wedge communicating with a damaged rail.

FIG. 4B is the front view of the roller and wedge communicating with the damaged rail shown in FIG. 4A.

FIG. 5 is a stress-strain curve for the material of the rail.

BEST MODE FOR CARRYING OUT THE INVENTION

Figure 1:
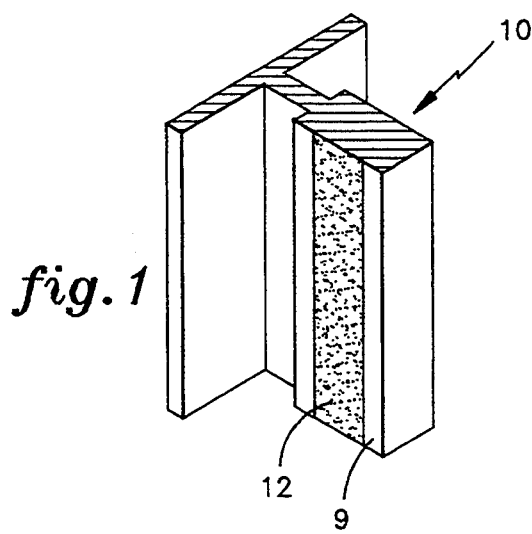
FIG. 1 is an isometric view of a scored elevator rail.

Referring to FIG. 1, a rail surface 9 of an elevator rail 10 used to guide and position an elevator car, may become scored 12 from time to time by the use of a progressive safety on an elevator car (not shown).

Figure 2:
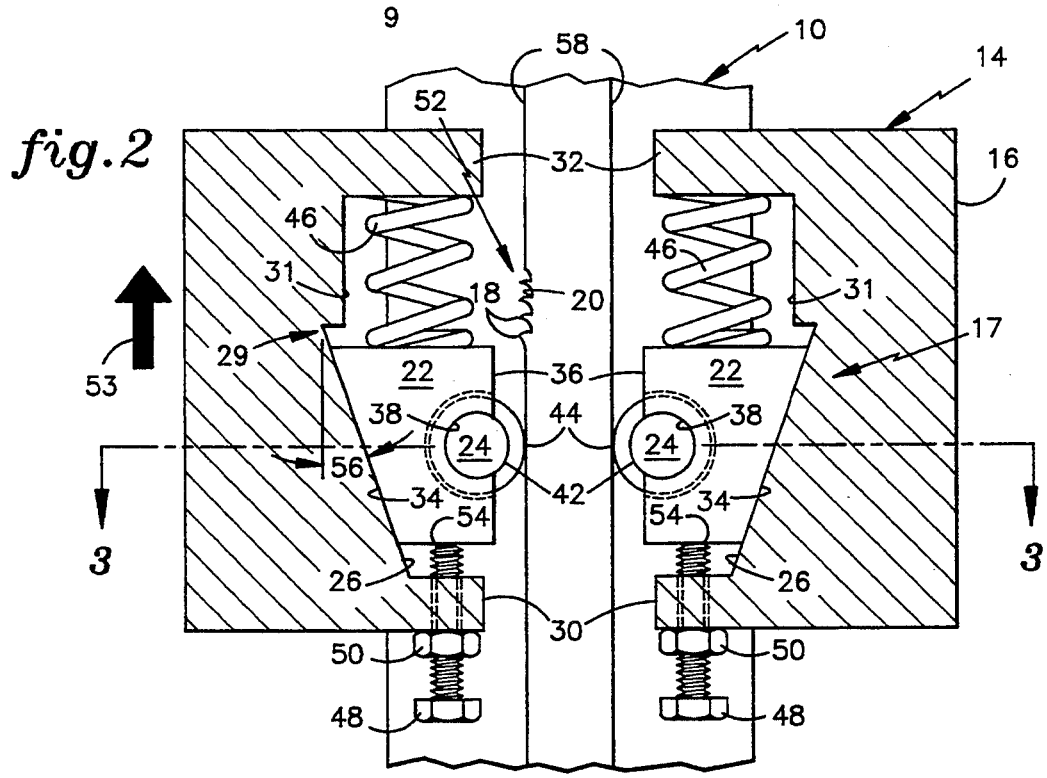
FIG. 2 is a cut-away of the present invention straddling a scored elevator rail.
Figure 3:
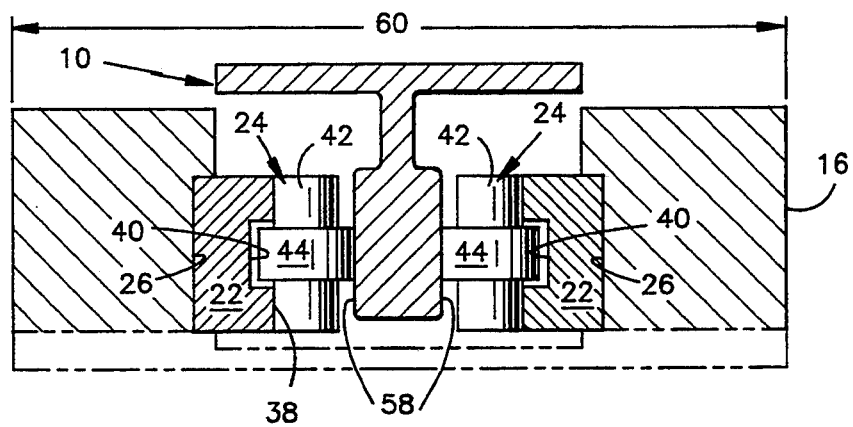
FIG. 3 is a sectional view of the cut-away shown in FIG. 2.

Referring to FIG. 2 and FIG. 3, an adjustable rail repair device 14 includes a housing 16 which straddles an elevator rail 10. The housing 16 supports means 17 for directing raised damaged areas 18 of the rail surface 9 of the elevator rail 10 back into the corresponding depressions 20 of the rail surface 9. In this embodiment, the means includes both a wedge 22 and a roller 24 positioned on each side of the rail 10. The housing 16 comprises a first cam surface 26 on each side of the rail 10. On one end 25, or bottom as shown, of each first cam surface 26 a threaded aperture 28 extends through a first projection 30 of the housing 16. The threaded apertures 28 run parallel to the rail 10. On the other end 29, or top, of the first cam surface 26, a shoulder 31 projects in the direction of the rail 10. The shoulder 31, in turn, communicates with a second projection 32 which also projects in the direction of the rail 10.

The rollers 24 comprise journal sections 42 and a center raised diameter section 44. The journal sections 42 rotatably communicate with the wedge 22. The center raised diameter section 44, in contrast, maintains a clearance fit with the wedge 22. The clearance fit allows the raised diameter section 44 to rotate freely.

The raised diameter section 44 comprises a material possessing a greater hardness than that of the rail 10. Alternatively, the entire roller 24 may be comprised of the harder material.

The wedges 22 comprise a second cam surface 34 which slidably contacts the first cam surface 26 the housing 16. On the exterior surface 36 of the wedge 22 opposite the second cam surface 34, the wedges 22 further comprise a pair of semi-circular bearing surfaces 38 for receiving the journal sections 42 of the roller 24. The journal sections rotatably communicate with the semi-circular bearing surfaces. A larger diameter semi-circular cavity 40 is positioned within the wedge 22 between the semicircular bearing surfaces 38, for receiving the raised center diameter section 44.

A spring 46 is located between the second projection 32 of the housing 16 and the wedge 22. The spring 46 biases the wedge 22 "down" the first cam surface 26 of the housing 16, in the direction which draws the wedge 22 closer to the rail 10. Unless the roller 24 contacts the rail 10 first, the spring 46 biases the wedge 22 "down" the first cam surface 26 against an adjustable stop 48. The adjustable stop 48 contacts the side of the wedge 22 opposite that contacting the spring 46. The threaded aperture 28 located in the first projection 30 of the housing 16 receives the adjustable stop 48. A lock nut 50 can be used to fix the position of the adjustable stop 48 relative to the housing 16.

When the adjustable rail repair device 14 is initially installed on the damaged rail 10, each wedge 22 and roller 24 is held in a position towards the top 29 of the first cam surface 26 of the housing, retracted from the rail 10. In this position the spring 46 is compressed, maintaining the wedge 22 against the adjustable stop 48. After the housing 16 is positioned around the damaged rail 10, each wedge 22 and roller 24 assembly is placed in contact with the damaged rail 10 by adjusting the respective adjustable stop 48. The adjustment is made by turning the adjustable stop 48 so that the wedge 22 travels "down" (urged by the spring) the first cam surface 26 of the housing, toward the rail 10.

Referring to FIGS. 4A, 4B, and 5, to determine the roller 24 position relative to the rail 10 necessary to correct the damaged area 52 of the rail 10, physical parameters and dimensions such as the undamaged rail thickness, the damaged rail thickness, the angle of the cam surfaces 34,26 of the wedge 22 and the housing 16, the material of the rail 10, the coarseness of the raised area 18, and the spring constant of the rail repair device 14, all must be considered. Once these parameters are evaluated, a value can be calculated representing the distance that the contact end 54 of the stop 48 should be offset from the wedge 22 to compensate for the spring rate of both the rail 10 and the rail repair device 14. The value may be determined by, for example, a mathematical equation, a graphical solution, or a computer program. The physical distance corresponding to this value can then be established by using a feeler gauge (not shown) between the contact end 54 of the stop 48 and the wedge 22. Once adjusted, the stop 48 can be locked in place with a lock nut 50.

To illustrate, a first embodiment can be described which employs a mathematical formula to calculate the distance the contact end 54 of the stop 48 must be offset from the wedge 22. The following table contains descriptions of the variables used within the formula:

| VARIABLE | DESCRIPTION |
| --- | --- |
| $d_1$ | Thickness of the rail (mm) |
| $d_2$ | Damaged rail thickness (mm) |
| $t$ | $d_2-d_1$; Height of extruded portion of damaged rail. (mm) |
| $d_3$ | Diameter of roller (mm) |
| $d_4$ | Width of damaged portion of rail (mm) |
| $d_5$ | Distance from contact end of stop to wedge (mm) |
| $k_2$ | Spring constant of rail repair device (N/mm) |
| $\sigma$ | Yield strength in compression of damaged portion of rail (MPa) |
| $E_1$ | Effective modulus of elasticity in compression of the damaged portion of the rail (MPa) |
| $E_2$ | Young's modulus of the roller material, in compression (MPa) |
| $\alpha$ | Angle of the taper of the wedge (degrees) |
| $\cot\alpha$ | Cotangent of the angle of the taper of the wedge |

FORMULA:

$$d_5 = \left( \frac{\sigma d_1}{2E_1} + 2.87 \frac{\sigma^2 d_2 d_4}{k_2 E_2} \right) \cot\alpha$$

This formula represents a preferred embodiment with respect to mathematical equations. Other mathematical embodiments or refinements may incorporate the relationship on which this formula is based.

Several of these values are physical measurements or material characteristics which can be readily determined. Other values must be determined from the measured data in conjunction with material characteristics or mathematical relationships. Specifically, to determine the effective value of the Modulus of Elasticity for the damaged rail, a stress-strain curve for the rail material can be referred to. Other embodiments may use stress-strain data described in different formats.

The strain ($\epsilon$) can be calculated by determining the percentage of elongation, $$\epsilon = \frac{t}{d_2} = \frac{d_2 - d_1}{d_2}.$$

Once the strain ($\epsilon$) is calculated, the stress ($\sigma$) can be determined from the curve. Furthermore, the tangent of the curve at the point of intersection 55 defined by the stress and strain values determined earlier, equals the effective value of Modulus of Elasticity ($E_1$) for the damaged rail. The effective Modulus of Elasticity value accounts for work hardening effects that may be present in the damaged rail material.

The other value that must be calculated before the formula can be employed is the spring constant for the rail repair device ($k_2$). This value can be determined once and attached to the device since it is a constant value, unique to each repair device.

To determine the spring constant, first measure the outer dimension 60 of the rail repair device 14. Second, apply a load of known magnitude between the rollers 24. Third, repeat the first step and measure the outer dimension 60 of the rail repair device 14. Subtracting the measurement taken before the load was applied from that taken afterward, reveals the amount the repair device has elastically deflected. The spring constant ($k_2$) can then be ascertained from Hooke's law ($F=kx$).

Given these values, the distance the contact end 54 of the stop 48 must be offset ($d_5$) from the wedge 22 can be calculated to compensate for the spring rate of the rail 10 and the rail repair device 14.

In a second embodiment, a tabular means can be used to determine the distance the contact end 54 of the stop 48 must be offset from the wedge 22. The table(s) would contain the aforementioned constant values and a range of values for the variables. From these tables the offset distance can be ascertained by applying the correct constants and variables. Moreover, these tables can also assume a number of graphical forms, for example a two-axis plotted curve graph.

In a third embodiment, a computer program can be developed which can, given the required constant values, calculate the offset distance.

After the correct roller 24 position relative to the rail 10 is determined, the damaged area 52 of the rail 10 can be repaired by drawing the rail repair device 14 in the "engaging" direction 53. The "engaging" direction 53 can be determined by drawing a vector from the adjustable stops 48 towards the springs 46, remaining parallel to the rail 10. Moving the device 14 in the "engaging" direction 53 will cause the rollers 24 and the wedges 22 to travel down the first cam surface 26 of the housing 16, finally drawing the rollers 24 into contact with the rail 10.

The load on the rollers 24 can be reduced to two components. The roller 24 will experience a first force, caused by the frictional contact with the rail 10, which runs parallel to the rail 10. The first cam surface 26 of the housing 16 will assume a percentage of this force, relative to the angle 56 of the first cam surface 26. In addition, the roller 24 will experience a second force perpendicular to the contacted rail surface 58. A percentage of the second force, in turn, will also be transmitted to the first cam surface 26 of the housing 16.

One advantage of using a cam design is that the first cam surface 26, and consequently the housing 16, assumes a large percentage of the loading which would be otherwise borne by the adjusting screw 48. A further advantage of the cam design is that it also provides a means of position adjustment of the roller 24 relative to the rail 10.

Although this invention has been shown and described with respect to detailed embodiments thereof, it will be understood by those skilled in the art that various changes in form and detail thereof may be made without departing from the spirit and scope of the claimed invention.

We claim:

1. An elevator rail repair device for repairing scored and damaged elevator rails, comprising:
   means for forcing raised damaged areas of an elevator rail surface back into corresponding depressions in said rail surface, wherein said means for forcing includes:
   a housing;
   a roller, rotatably cooperating within said housing, said roller forcing said raised damaged areas back into said corresponding depressions of the rail;
   a first cam surface disposed in said housing; and
   a wedge, which mounts said roller for rotation therein, said wedge having a second cam surface which slidably contacts said first cam surface of said housing.

2. An elevator repair device according to claim 1, wherein said wedge further comprises:
   a pair of semi-circular bearing surfaces for receiving said roller; and
   a semi-circular cavity having a greater diameter than said bearing surfaces, said cavity being positioned between said pair of semi-circular bearing surfaces.

3. An elevator repair device according to claim 2, wherein said roller further comprises:
   a center raised diameter section which rotates free of said wedge; and
   a journal section which pivots within said bearing surfaces of said wedge on each side of said raised center diameter section.

4. An elevator repair device according to claim 1, further comprising:
   a spring, acting against said wedge, biasing said wedge up said first cam surface of said housing;
   an adjustable stop, attached to said housing, wherein said adjustable stop adjusts said wedge, and therefore said roller, relative to the rail; and
   a locking nut attached to said adjustable stop, wherein said locking nut fixes said adjustable stop relative to said housing.

5. An elevator rail repair device for repairing scored and damaged elevator rails by forcing raised damage areas of an elevator rail surface into corresponding depressions in said rail surfaces, comprises:
   a housing, having a first cam surface; said housing supporting
   a roller; which rotatably communicates with
   a wedge, comprising a second cam surface, wherein said second cam surface slidably contacts with said first cam surface of said housing; and
   an adjustable stop attached to said housing.

6. An elevator rail repair device for repairing scored and damaged elevator rails according to claim 9, wherein said housing further comprises:
   a threaded aperture for receiving said adjustable stop.

7. An elevator repair device according to claim 5, wherein said wedge further comprises:
   a pair of semi-circular bearing surfaces for receiving said roller; and
   a semi-circular cavity having a greater diameter than said bearing surfaces, said cavity being positioned between said pair of semi-circular bearing surfaces 8. An elevator repair device according to claim 5, wherein said roller further comprises:
   a center raised diameter section which rotates free of said wedge; and
   a journal section which pivotally communicates within said bearing surfaces of said wedge on each side of said raised center diameter section.

9. An elevator repair device according to claim 5, further comprising:
   a spring acting against said wedge, biasing said wedge up said first cam surface of said housing; and
   a locking nut attached to said adjustable stop, wherein said locking nut fixes the position of said adjustable stop relative to said housing.

10. A method for repairing scored and damaged elevator rails by forcing raised damage areas of an elevator rail surface into corresponding depressions in said rail surfaces with a rail repair device comprising means for forcing raised damaged areas of an elevator rail surface back into corresponding depressions in said rail surface, comprising the steps of:
- measuring physical dimensions and parameters of the damaged rail;
- calculating a value the rail repair device must be set at to force said raised areas back into said corresponding depressions;
- adjusting the device accordingly, based upon said calculation; and
- moving the rail repair device across the damaged area of the rail.

11. A method for repairing scored and damaged elevator rails, according to claim 10, wherein said calculating step comprises a mathematical formula.

12. A method for repairing scored and damaged elevator rails, according to claim 10, wherein said calculating step comprises a tabular solution.

13. A method for repairing scored and damaged elevator rails, according to claim 10, wherein said calculating step comprises a computer program.

14. A method for repairing scored and damaged elevator rails, according to claim 10, wherein said calculating step comprises a graphical solution.

15. A method for repairing scored and damaged elevator rails by forcing raised damage areas of an elevator rail surface into corresponding depressions in said rail surfaces with a rail repair device comprising a housing, having a first cam surface and a roller, supported by the housing, which rotatably communicates with a wedge, comprising a second cam surface, wherein the second cam surface slidably contacts with the first cam surface of the housing, and an adjustable stop attached to the housing, comprising the steps of:
- measuring physical dimensions and physical parameters of the damaged rail;
- calculating a value the rail repair device must be set at to force said raised areas back into said corresponding depressions;
- adjusting the device accordingly, based upon said calculations; and
- moving the rail repair device across the damaged area of the rail.

16. A method for repairing scored and damaged elevator rails, according to claim 15, wherein said calculating step comprises a mathematical formula.

17. A method for repairing scored and damaged elevator rails, according to claim 15, wherein said calculating step comprises a tabular solution.

18. A method for repairing scored and damaged elevator rails, according to claim 15, wherein said calculating step comprises a computer program.

19. A method for repairing scored and damaged elevator rails, according to claim 15, wherein said calculating step comprises a graphical solution.

* * * * *